(12) United States Patent
Hanyu

(10) Patent No.: US 7,672,196 B1
(45) Date of Patent: Mar. 2, 2010

(54) SOUND SOURCE LOCALIZING APPARATUS AND METHOD

(75) Inventor: Toshiki Hanyu, Saitama (JP)

(73) Assignee: Nihon University, Tokyo (JP)

( * ) Notice: Subject to any disclaimer, the term of this patent is extended or adjusted under 35 U.S.C. 154(b) by 162 days.

(21) Appl. No.: 11/667,612

(22) PCT Filed: Nov. 16, 2005

(86) PCT No.: PCT/JP2005/021040

§ 371 (c)(1),
(2), (4) Date: Oct. 15, 2007

(87) PCT Pub. No.: WO2006/054599

PCT Pub. Date: May 26, 2006

(30) Foreign Application Priority Data

Nov. 16, 2004 (JP) ............................ 2004-332383

(51) Int. Cl.
*G01S 3/80* (2006.01)
(52) U.S. Cl. ...................................... 367/124
(58) Field of Classification Search ............ 367/87–190
See application file for complete search history.

(56) References Cited

U.S. PATENT DOCUMENTS

| | | | | |
|---|---|---|---|---|
| 3,418,013 A | * | 12/1968 | Kelly | ........................... 403/22 |
| 5,953,287 A | * | 9/1999 | Willacy et al. | ............... 367/104 |
| 7,215,785 B1 | * | 5/2007 | Ju | ............................... 381/92 |

FOREIGN PATENT DOCUMENTS

| | | |
|---|---|---|
| JP | 6-230098 A | 8/1994 |
| JP | 2002-39851 A | 2/2002 |
| JP | 2002-62348 A | 2/2002 |
| JP | 2004-12151 A | 2/2004 |

* cited by examiner

*Primary Examiner*—Thomas H Tarcza
*Assistant Examiner*—Luke D Ratcliffe
(74) *Attorney, Agent, or Firm*—Reed Smith LLP

(57) ABSTRACT

A sound source localizer is provided which includes a receiver (41) composed of a plurality of highly versatile microphones (10) each having a predetermined directivity D, a data base (12) which is to calculate a difference in directional sensitivity between one of the microphones (10) of the receiver (41) pointed in one direction and the other directed at an angle of 180 deg. to the one direction and has pre-stored therein information used for determination of an arrival direction and angle of a sound source, and a calculator (11) for calculating differences in level between signals received by the receiver (41) in different directions to determine the arrival direction, angle and sound level of the sound source with reference to the information stored in the data base (12).

3 Claims, 16 Drawing Sheets

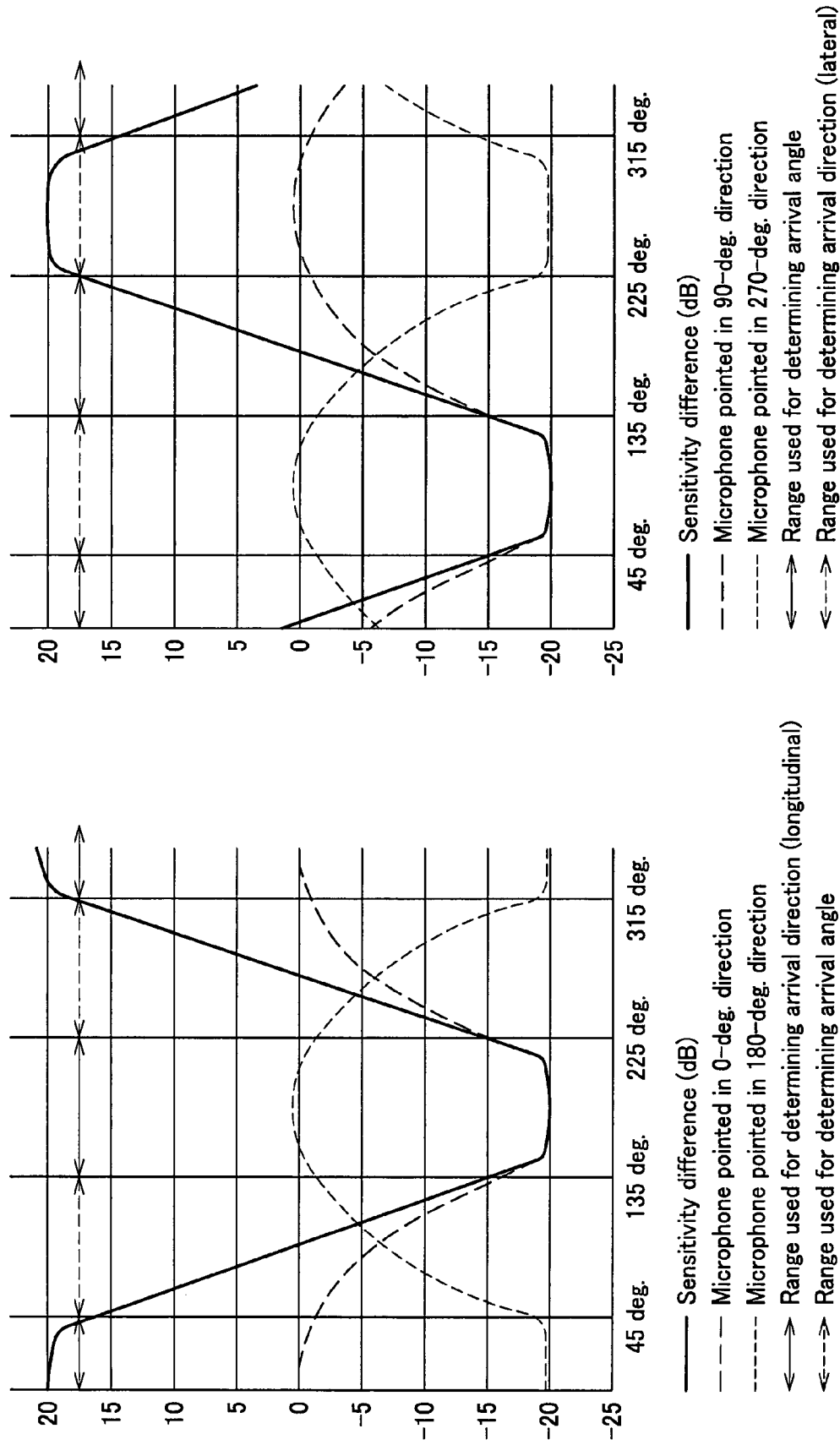

| No. of data | 512 | 4096 | 32768 |
|---|---|---|---|
| 31.5Hz | · | 280 | 280 |
| 63Hz | · | 312 | 273 |
| 125Hz | 313 | 320 | 317 |
| 250Hz | 323 | 328 | 329 |
| 500Hz | 320 | 320 | 320 |
| 1kHz | 323 | 323 | 323 |
| 2kHz | 331 | 331 | 331 |
| 4kHz | 337 | 337 | 337 |
| 8kHz | 349 | 349 | 349 |
| 16kHz | 350 | 350 | 350 |

FIG.17A

| No. of data | 512 | 4096 | 32768 |
|---|---|---|---|
| 31.5Hz | · | 307 | 294 |
| 63Hz | · | 313 | 301 |
| 125Hz | 312 | 309 | 310 |
| 250Hz | 319 | 323 | 327 |
| 500Hz | 317 | 318 | 322 |
| 1kHz | 320 | 322 | 323 |
| 2kHz | 327 | 328 | 329 |
| 4kHz | 333 | 333 | 334 |
| 8kHz | 345 | 347 | 347 |
| 16kHz | 302 | 316 | 350 |

FIG.17B

SOUND SOURCE LOCALIZING APPARATUS AND METHOD

TECHNICAL FIELD

The present invention relates to a sound source localizing apparatus and method.

This application claims the priority of the Japanese Patent Application No. 2004-332383 filed in the Japanese Patent Office on Nov. 16, 2004, the entirety of which is incorporated by reference herein.

BACKGROUND ART

For accurate evaluation of a sound field, it is important to determine where the sound comes from, namely, to get information on the arrival direction of the sound. For measurement of an indoor sound field, the proximity four-point method (cf. Kenji Endoh, Yoshio Yamazaki, Tsuyoshi Itoh "Determination and Development of Space Information by the Proximity Four-Point Method"—Architectural Acoustics Committee, Document AA85-21 (July, 1985) and Japanese Patent Laid Open No. 2000-354290)), tetrahedron vertex method or the like has been used in the past to extract sound-direction information on the basis of a difference between a time when a sound wave is incident upon one of microphones on different channels and time when the sound wave is incident upon another microphone.

In case a plurality of sound waves is incident upon one microphone at the same time, however, it is difficult to differentiate between the sound waves and make accurate estimation of the arrival directions of them. Also, since the arrival directions of the sound waves are estimated by analyzing the response of a test signal (impulse), namely, impulse response, by post-processing, it is difficult to get any real-time directional information.

DISCLOSURE OF THE INVENTION

It is accordingly desirable to provide a sound source localizing apparatus and method, capable of real-time estimation of the arrival direction of noises and musical sound without using any special test signal.

According an embodiment of the present invention, there is provided a sound source localizing apparatus including:

a receiving means including first to fourth receivers each having a predetermined directivity and all disposed at a measuring point set in an arbitrary place to receive a signal coming from a sound source, the first receiver being pointed in a reference direction too show a highest directional sensitivity, second receiver being directed at an angle of 90 deg. to the reference direction to show a highest directional sensitivity, third receiver being directed at an angle of 180 deg. to the reference direction for a highest directional sensitivity, and the fourth receiver being directed at an angle of 270 deg. to the reference direction to show a highest directional sensitivity;

a storage means having stored therein a first sensitivity-difference data base including angle-by-angle differences in sensitivity between the first receiver directed in the reference direction to show the predetermined directivity and third receiver directed at the angle of 180 deg. to the reference direction to show the predetermined directivity and a second sensitivity-difference data base including angle-by-angle differences in sensitivity between the second receiver directed at the angle of 90 deg. to the reference direction to show the predetermined directivity and fourth receiver directed at the angle of 270 deg. to the reference direction to show the predetermined directivity;

a first calculating means for calculating a difference in level between a signal received by the first receiver and signal received by the third receiver;

a second calculating means for calculating a difference in level between a signal received by the second receiver and signal received by the fourth receiver;

an arrival-angle determining means for making a comparison between a result of the calculation made in the first calculating means and result of the calculation made in the second calculating means to determine an arrival angle of the sound source on the basis of the result of comparison and with reference to a range used for determination of a sound-source arrival angle depending upon the first and second sensitivity-difference data bases stored in the storage means; and an arrival-direction deciding means for deciding an arrival direction of the sound source on the basis of the result of the determination made in the arrival-angle determining means and with reference to a range used for determination of a sound-source arrival direction depending upon the first and second sensitivity-difference data bases stored in the storage means.

Also, according to another embodiment of the present invention, there is provided a sound source localizing method including:

a first calculating step of calculating a difference in level between a signal received by a first receiver having a predetermined directivity, disposed at a measuring point set in an arbitrary place to receive a signal coming from a sound source and pointed in a reference direction to show a highest directional sensitivity and signal received by a third receiver having a predetermined directivity, disposed at the measuring point and directed at an angle of 180 deg. to the reference direction to show a highest directional sensitivity;

a second calculating step of calculating a difference in level between a signal received by a second receiver having a predetermined directivity, disposed at the measuring point and directed at an angle of 90 deg. to the reference direction to show a highest directional sensitivity and signal received by a fourth receiver having a predetermined directivity, disposed at the measuring point and directed at an angle of 270 deg. to the reference direction to show a highest directional sensitivity;

an arrival-angle determining step of making a comparison between a result of the calculation made in the first calculating step and result of the calculation made in the second calculating step to determine an arrival angle of the sound source on the basis of the result of comparison and with reference to a range used for determination of a sound-source arrival angle depending upon a first sensitivity-difference data base including differences in sensitivity between the first receiver pointed in the reference direction to show the predetermined directivity and third receiver directed at the angle of 180 deg. to the reference direction to show the predetermined directivity and a second sensitivity-difference data base including differences in sensitivity between the second receiver directed at the angle of 90 deg. to the reference direction to show the predetermined directivity and fourth receiver directed at the angle of 270 deg. to the reference direction to show the predetermined directivity; and an arrival-direction deciding step of deciding an arrival direction of the sound source on the basis of the result of the determination made in the arrival-angle determining step and with reference to a range used for determination of a sound-source arrival direction depending upon the first and second sensitivity-difference data bases stored in the storage means.

According an embodiment of the present invention, there is provided a sound source localizing apparatus including:

a receiving means having a predetermined directivity to receive a signal coming from a sound source and disposed at a measuring point set in an arbitrary place;

a rotation driving means for rotating the receiving means to a reference direction in which the receiving means shows a highest directional sensitivity, and to an angle of 90 deg., angle of 180 deg. and angle of 270 deg., respectively, to the reference direction to show the highest directional sensitivity;

a storage means having stored therein a first sensitivity-difference data base including differences in sensitivity of the receiving means between when pointed in the reference direction to show the predetermined directivity and when directed at the angle of 180 deg. to the reference direction to show the predetermined directivity and a second sensitivity-difference data base including differences in sensitivity of the receiving means between when directed at the angle of 90 deg. to the reference direction to show the predetermined directivity and when directed at the angle of 270 deg. to the reference direction to show the predetermined directivity;

a first calculating means for calculating a difference in level between a signal received by the receiving means pointed in the reference direction to show the predetermined directivity and signal received by the receiving means directed at the angle of 180 deg. to the reference direction to show the predetermined directivity;

a second calculating means for calculating a difference in level between a signal received by the receiving means directed at the angle of 90 deg. to the reference direction to show the predetermined directivity and signal received by the receiving means at the angle of 270 deg. to the reference direction to show the predetermined directivity;

an arrival-angle determining means for making a comparison between a result of the calculation made in the first calculating means and result of the calculation made in the second calculating means to determine an arrival angle of the sound source on the basis of the result of comparison and with reference to a range used for determination of a sound-source arrival angle depending upon the first and second sensitivity-difference data bases stored in the storage means; and an arrival-direction deciding means for deciding an arrival direction of the sound source on the basis of the result of the determination made in the arrival-angle determining means and with reference to a range used for determination of a sound-source arrival direction depending upon the first and second sensitivity-difference data bases stored in the storage means.

Also, according to another embodiment of the present invention, there is provided a sound source localizing method including:

a first calculating step of calculating a difference in level between a signal received by a receiving means having a predetermined directivity and which receives a signal coming from a sound source when directed in a reference direction to show the predetermined directivity and signal received by the receiving means when directed at an angle of 180 deg. to the reference direction to show the predetermined directivity;

a second calculating step of calculating a difference in level between a signal received by the receiving means directed at the angle of 90 deg. to the reference direction to show the predetermined directivity and signal received by the receiving means directed at the angle of 270 deg. to the reference direction to show the predetermined directivity;

an arrival-angle determining step of making a comparison between a result of the calculation made in the first calculating step and result of the calculation made in the second calculating step to determine an arrival angle of the sound source on the basis of the result of comparison and with reference to a range used for determination of a sound-source arrival angle depending upon a first sensitivity-difference data base including differences in sensitivity between the first receiver pointed in the reference direction to show the predetermined directivity and third receiver directed at the angle of 180 deg. to the reference direction to show the predetermined directivity and a second sensitivity-difference data base including differences in sensitivity between the second receiver directed at the angle of 90 deg. to the reference direction to show the predetermined directivity and fourth receiver directed at the angle of 270 deg. to the reference direction to show the predetermined directivity; and an arrival-direction deciding step of deciding an arrival direction of the sound source on the basis of the result of the determination made in the arrival-angle determining step and with reference to a range used for determination of a sound-source arrival direction depending upon the first and second sensitivity-difference data bases stored in the storage means.

The foregoing and other features, aspects and advantages of the present invention will become apparent from the following detailed description of embodiments of the present invention when taken in conjunction with the accompanying drawings.

BRIEF DESCRIPTION OF THE DRAWINGS

FIGS. 8A and 8B explain sensitivity curves plotted based on the differences in directional sensitivity as shown in FIG. 7.

FIG. 17A shows an energy-weighted mean of the white noise and FIG. 17B shows an energy-weighted mean of the male announcer's voice.

BEST MODE FOR CARRYING OUT THE INVENTION

The present invention will be described in detail below concerning embodiments of the sound source localizer according to the present invention with reference to the accompanying drawings.

Figure 1:
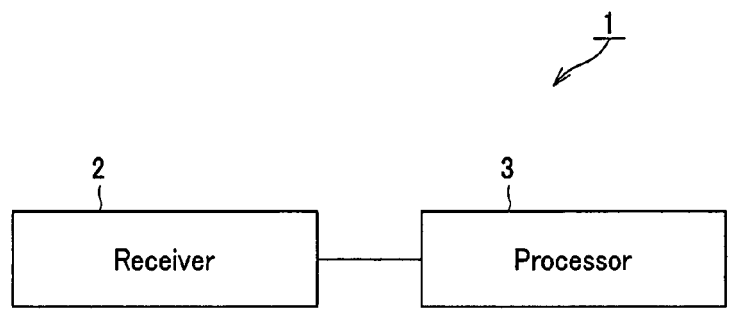
FIG. 1 is a schematic block diagram of a sound source localizer as an embodiment of the present invention.

First, the sound source localizer as the embodiment of the present invention will be described in detail below with reference to FIG. 1. The sound source localizer is generally indicated with a reference numeral 1. As shown, the sound source localizer 1 includes a receiver 2 composed of a plurality of microphones which receive a signal coming from a sound source, and a processor 3 that processes the signal received by the receiver 2 in a predetermined manner.

Figure 2:
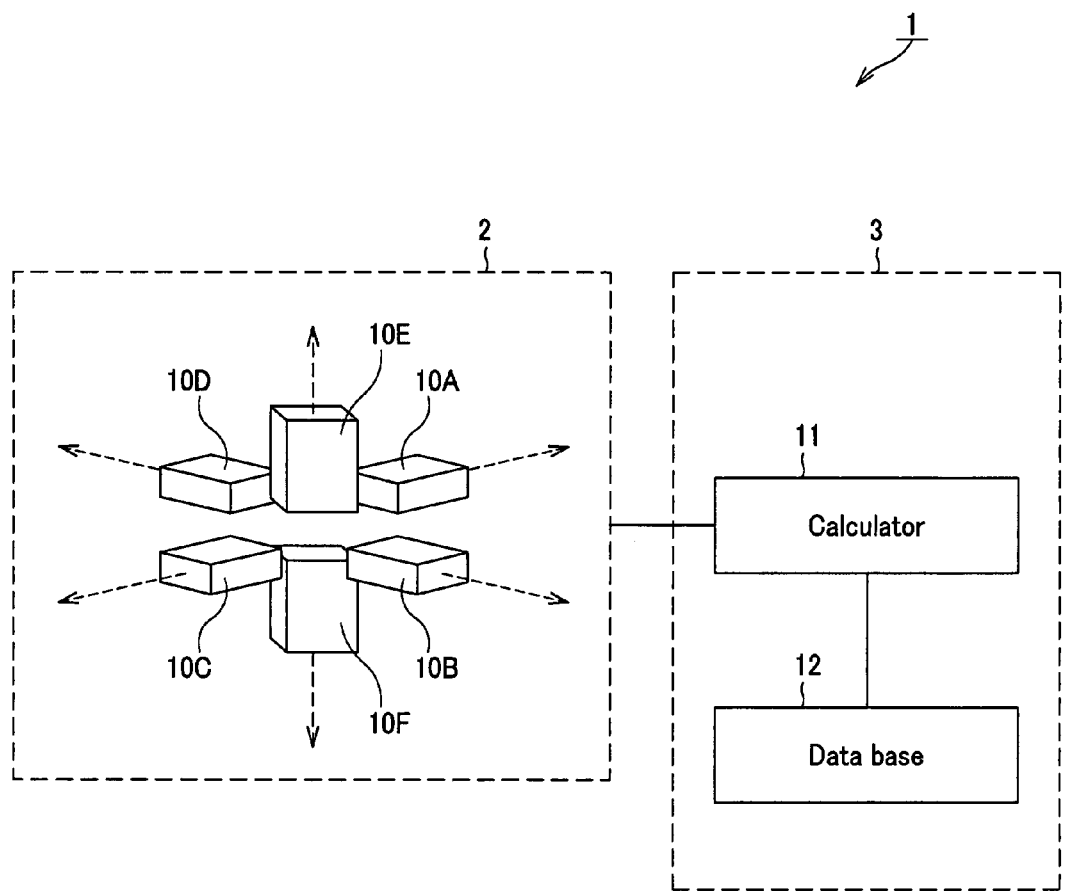
FIG. 2 is also a detailed schematic block diagram of the sound source localizer in FIG. 1, showing the receiver and processor in detail.

As shown in FIG. 2, the receiver 2 includes, for example, a plurality of microphones 10A to 10F disposed at a measuring point set in an arbitrary place. Each of the microphones has a predetermined directivity D and receives a signal coming from a sound source. The microphone 10A is pointed in a 0-degree direction (reference direction) to show the predetermined directivity D, microphone 10B is directed at an angle of 90 deg. (rightward) to the microphone 10A to show the predetermined directivity D, microphone 10C is directed at an angle of 180 deg. (rearward) to the microphone 10A to show the predetermined directivity D, microphone 10D is directed at an angle of 270 deg. (leftward) to the microphone 10A to show the predetermined directivity D, microphone 10E is directed upward perpendicularly to the microphones 10A to 10D to show predetermined directivity D and microphone 10F is directed at an angle of 180 deg. (downward perpendicularly) to the microphone 10E to show the predetermined directivity D. It should be noted that the receiver 2 may be composed of the four microphones 10A to 10D. Also, consideration should be given to how the effective acoustic centers are to be set in disposing the microphones. All the microphones may collectively be disposed nearly at one point or they may be disposed so that the distances from one arbitrary point to their respective effective acoustic centers are equal to each other.

Figure 3:
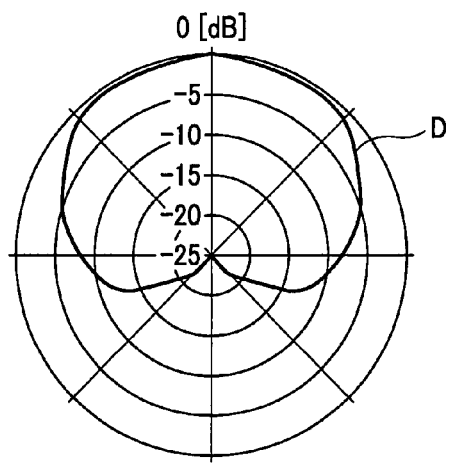
FIG. 3 shows the directivity of a microphone.

Also, the directivity D the microphones 10A to 10F have is a highly versatile cardioid-shaped one, for example, as shown in FIG. 3.

Figure 4:
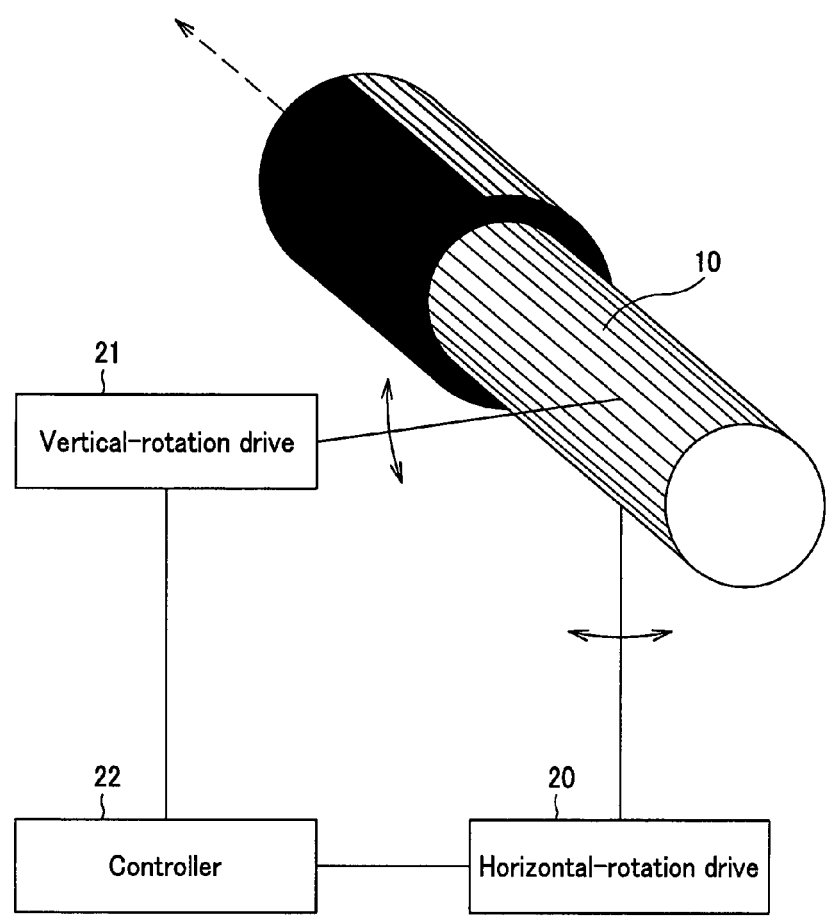
FIG. 4 is a block diagram of a variant of the receiver.

The receiver 2 may be composed of a horizontal rotation drive 20 to rotate the microphone 10 horizontally, a vertical rotation drive 21 to rotate the microphone 10 vertically, and a controller 22 to control the horizontal and vertical rotation drives 20 and 21, as shown in FIG. 4.

The horizontal rotation drive 20 is controlled by the controller 22 to rotate the microphone 10 horizontally to an arbitrary angle. The vertical rotation drive 21 is controlled by the controller 22 to rotate the microphone 10 vertically to an arbitrary angle.

With the above construction of the receiver 2, the microphone 10 can be driven three-dimensionally to provide an effect similar to that when the receiver 2 is composed of the six microphones as shown in FIG. 2.

Figure 6B:
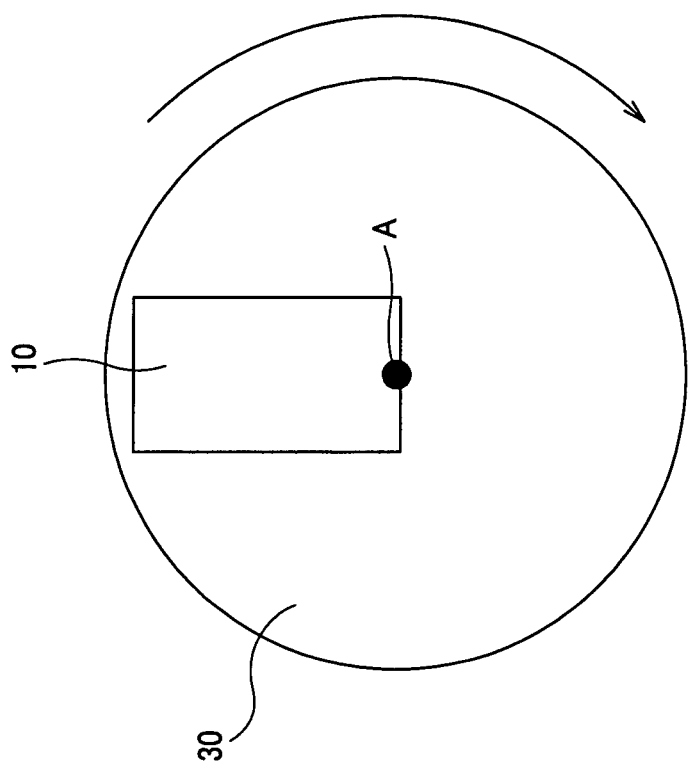
FIGS. 6A and 6B explain the rotation of the microphone by a turntable in the receiver shown in FIG. 5.
Figure 6A:
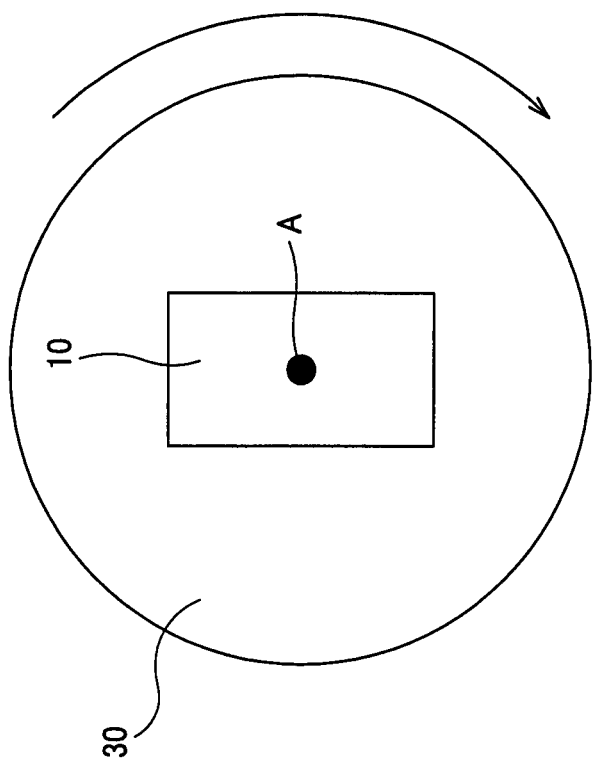

Also, the receiver 2 may be adapted to have the microphone 10 disposed on a turntable 30 as shown in FIG. 6. The turntable 30 is controlled by a drive 31 to turn the microphone 10 in such a manner that the latter is pointed sequentially in the 0-deg. direction (reference direction), 90-deg. direction, 180- deg. direction and then in the 270-deg. direction. It should be noted that how the effective acoustic center is to be set in disposing the microphone 10. The effective acoustic center of the microphone 10 may be set to coincide with a pivot A of the turntable 30 as in FIG. 6A or it may be rotated while being kept at a fixed distance from the pivot A of the turntable 30 as in FIG. 6B.

Figure 5:
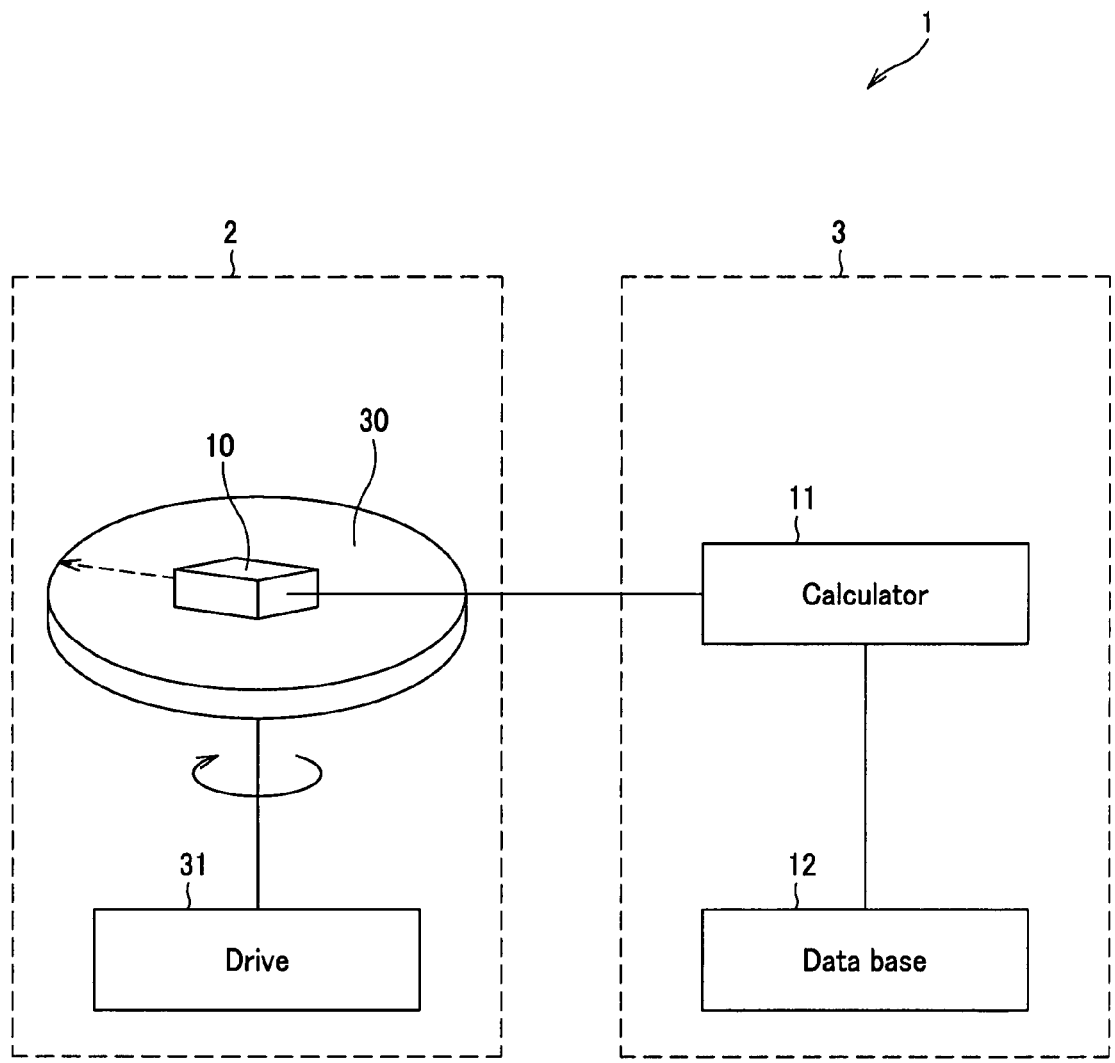
FIG. 5 is also a block diagram of another variant of the receiver.

The processor 3 is constructed as will be explained below. As shown in FIGS. 2 and 5, the processor 3 includes a calculator 11 to calculate a signal level based on a signal received by the receiver 2 and a data base 12 having stored therein various kinds of information on the directivity D of the microphone and the like.

Figure 7B:
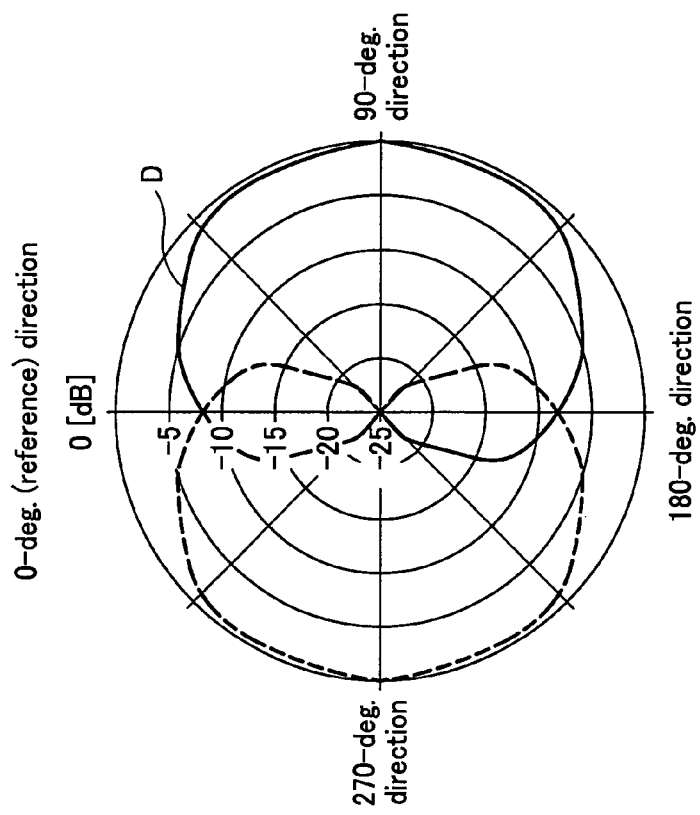
FIGS. 7A and 7B explain differences in directional sensitivity of the microphone between when pointed in a direction and when directed at an angle of 180 deg. to the direction.
Figure 7A:
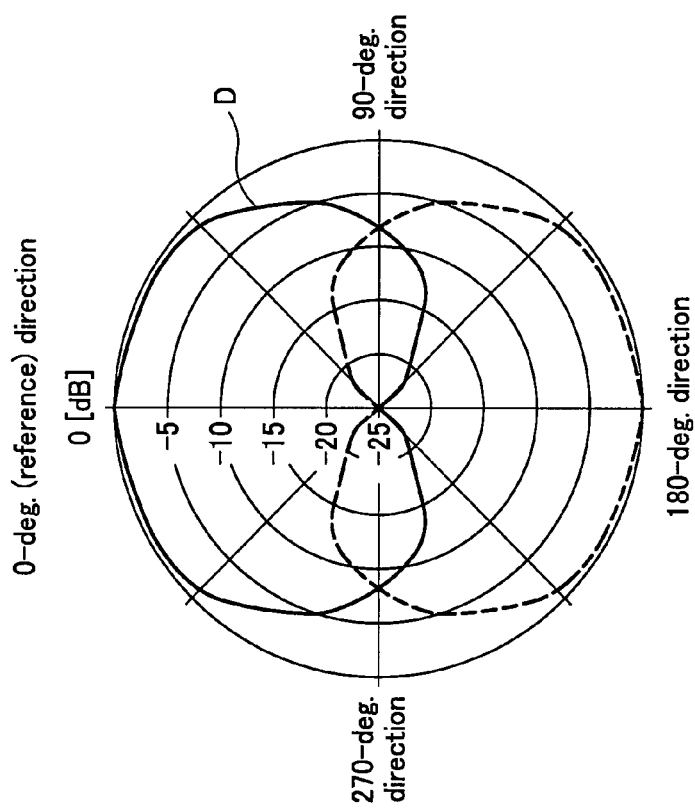

It is assumed here that the data base 12 has pre-stored therein information used for determination of the arrival direction of the sound source and information used for determination of the arrival angle of the sound source. The information stored in the data base 12 will be explained herebelow. The data base 12 has stored therein a first sensitivity-difference data base (as in FIG. 8A) including a difference in sensitivity between when the microphone is pointed in the 0-deg. direction (reference direction) to show the predetermined directivity D and when it is pointed in the 180-deg. direction to show the predetermined directivity D as shown in FIG. 7A, and a second sensitivity-difference data base (as in FIG. 8B) including a difference in sensitivity when the microphone is pointed in the 90-deg. direction to show the predetermined directivity D and when it is pointed in the 270-deg. direction to show the predetermined directivity D as shown in FIG. 7B. A range used for determining a sound-source arrival direction and range used for determining a sound-source arrival direction are set based on the first and second sensitivity-difference data bases. Therefore, the larger the gradient of sensitivity difference in the sensitivity-difference data bases, the higher the arrival angle can be estimated as shown in FIG. 8. That is, since the angle resolution is uniform, the calculator 11 which will further be explained layer uses the above range for determination of the sound-source angle while using, for determination of the sound-source arrival direction, a range in which the gradient of sensitivity difference is small but the sensitivity difference data base is large.

In the above example, the microphones are disposed two-dimensionally, that is, four microphones are displayed perpendicular to each other. In case the microphones are disposed three-dimensionally, two other microphones are disposed vertically upward and downward, respectively, for their highest directivity in relation to the four microphones disposed two-dimensionally. In this case, information resulted from calculation of a third sensitivity-difference data base is also stored in the data base 12. With such a three-dimensional geometry of the microphones, it is possible to determine three-dimensional arrival direction and angle of the sound source.

Figure 9:
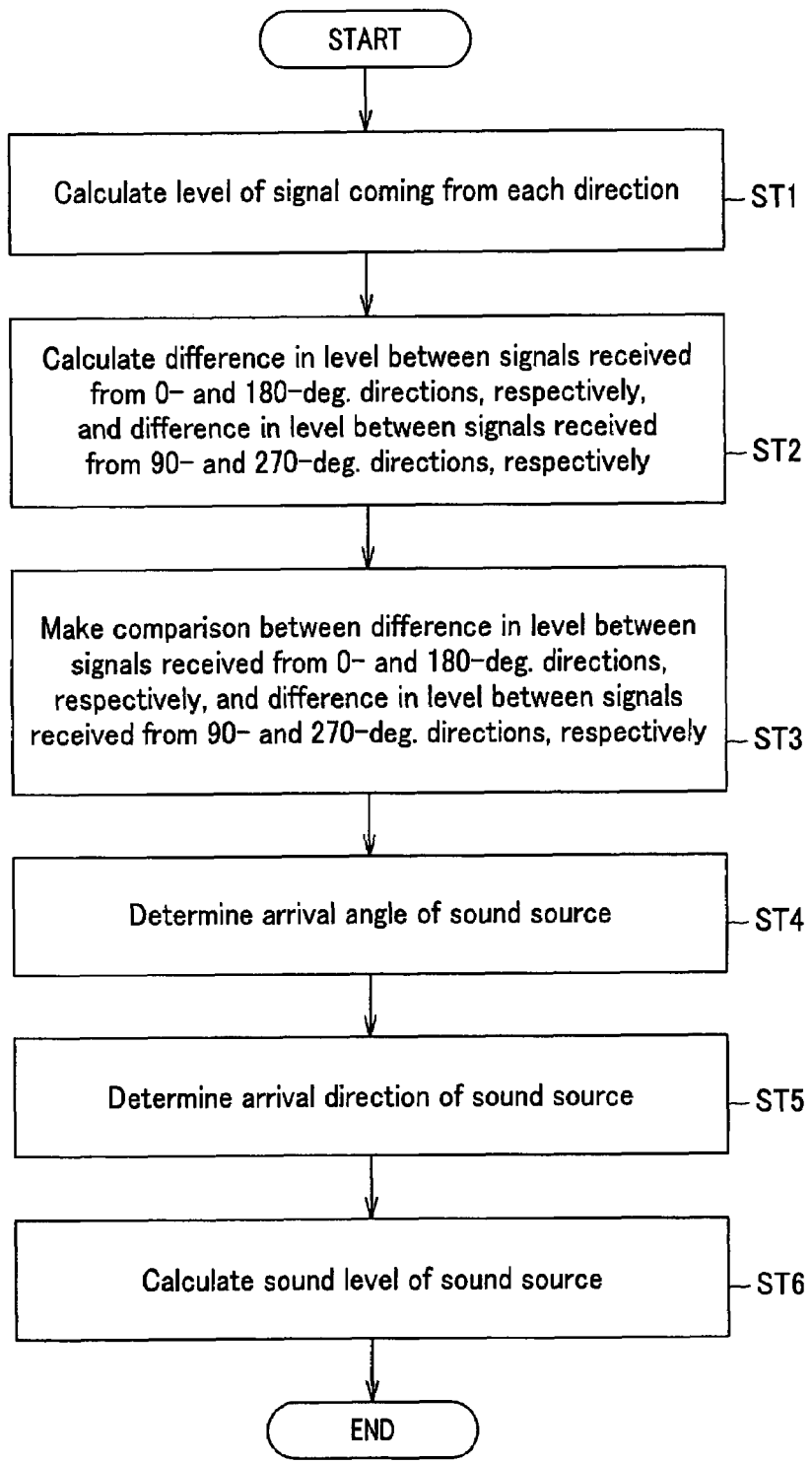
FIG. 9 shows a flow of operations made in determination of an arrival direction and angle of a sound source.

Now, it will be explained below with reference to a flow diagram in FIG. 9 how the calculator 11 to calculate for determination of the arrival direction and angle of the sound source. It should be noted that the procedure of determining the sound-source arrival direction and angle will be explained on the assumption that the microphones are pointed two-dimensionally in the 0-deg. direction (reference direction), 90-deg. direction, 180-deg. direction and 270-deg. direction, respectively.

Figure 10:
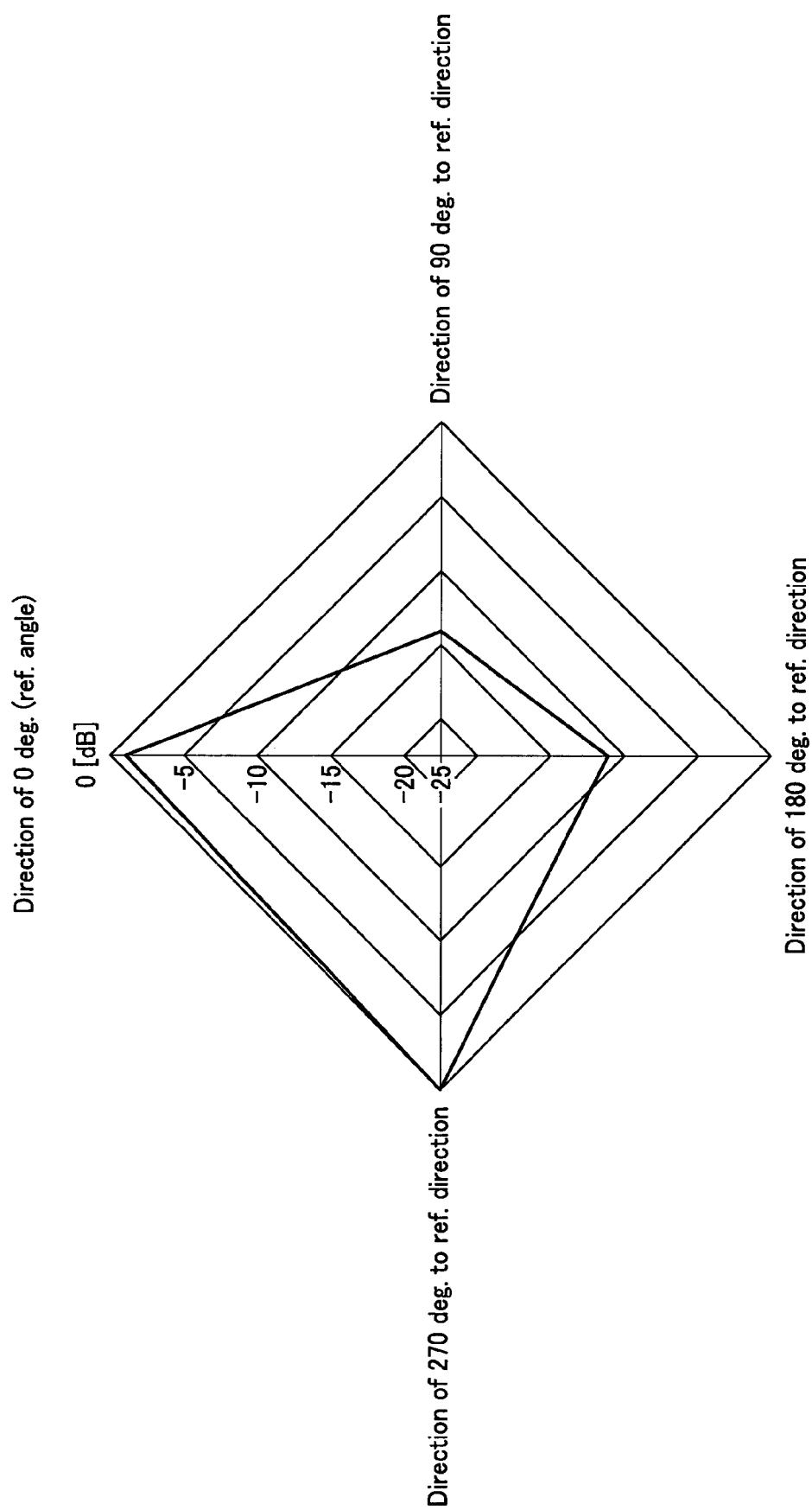
FIG. 10 shows levels of a signal detected in different directions.

In step ST1, the calculator 11 calculates levels of signals coming from the above directions based on a signal supplied from the receiver 2 to provide a reception level in each of the directions. The receiver 2 receives signals from the directions and supplies the received signals to the calculator 11. FIG. 10 shows results of the calculations made in the calculator 11. As shown, the level of the signal received from the 0-deg. direction (reference direction) is about −1 dB, level of the signal received from the 90-deg. direction is about −14 dB, level of the signal received from the 180-deg. direction is about −12 dB and the level of the signal received from the 270-deg. direction is about 0 dB.

In step ST2, the calculator 11 calculates, based on the received-signal level, calculated in step ST1, in each of the microphone directions, a difference in level between the signals received from the 0-deg. direction (reference direction) and 180-deg. direction, respectively, and a difference in level between the signals received from the 90-deg. direction (reference direction) and 270-deg. direction, respectively. The measured difference in level between the signals received from the 0-deg. direction (reference direction) and 180-deg. direction, respectively, is 11 dB (=−1−(−12)) and the measured a difference in level between signals received from the 90-deg. direction (reference direction) and 270-deg. direction, respectively, is 14 dB (0−(−14)).

In step ST3, the calculator 11 makes a comparison between the difference in level between the signals received from the 0-deg. direction (reference direction) and 180-deg. direction, respectively, and the difference in level between the signals received from the 90- and 270-deg. directions, respectively.

In step ST4, the calculator 11 determines an arrival angle of the sound source on the basis of the result of the comparison made in step ST3 and with reference to the range used for determining the sound-source arrival angle depending upon the first and second sensitivity-difference data bases stored in the data base 12. The calculator 11 determines the sound-source arrival angle on the basis of one of the received-signal levels which is smaller than the result of the comparison made in step ST3, that is, the difference in level (11 dB) between the signals received from the 0- and 180-deg. directions, respectively. Thus, the calculator 11 shows, based on the information (as in FIG. 8A) stored in the data base 12, that the curves of the signals received from the 0- and 180-deg. directions, respectively, intersect each other at a difference in received-signal level of 11 dB and at 55 deg. or 305 deg.

In step ST5, the calculator 11 determines an arrival direction of the sound source on the basis of the result of the comparison made in step ST4 and with reference to the range used for determining the sound-source arrival direction depending upon the first and second sensitivity-difference data bases stored in the data base 12. The calculator 11 determines the sound-source arrival direction on the basis of one of the received-signal levels which is larger than the result of the comparison, that is, the difference in level (14 dB) between the signals received from the 90- and 270-deg. directions, respectively. Thus, the calculator 11 shows, based on the information (as in FIG. 8B) stored in the data base 12, that the curves of the signals received from the 90- and 270-deg. directions, respectively, intersect each other at a difference in received-signal level of 14 dB within an angular range from 180 to 360 deg. (leftward). It should be noted that it is roughly determined based on the difference in level between the signals received from the 0- and 180-deg. directions, respectively, that the sound from the sound source arrives either at the front of the microphone 10 (0 to 90 deg. and 270 to 360 deg.) or at the back of the microphone 10 (90 to 270 deg.), and based on the direction in level between the signals received from the 90- and 270-deg. directions, respectively, that the sound arrives at either the right (0 to 180 deg.) of the microphone 10 or as the left of the microphone 10 (180 to 360 deg.).

Accordingly, the calculator 11 determines the sound-source arrival angle to be 305 deg. on the basis of the sound-source arrival direction (within a range of 180 to 360 deg.) decided in step ST5.

Figure 11:
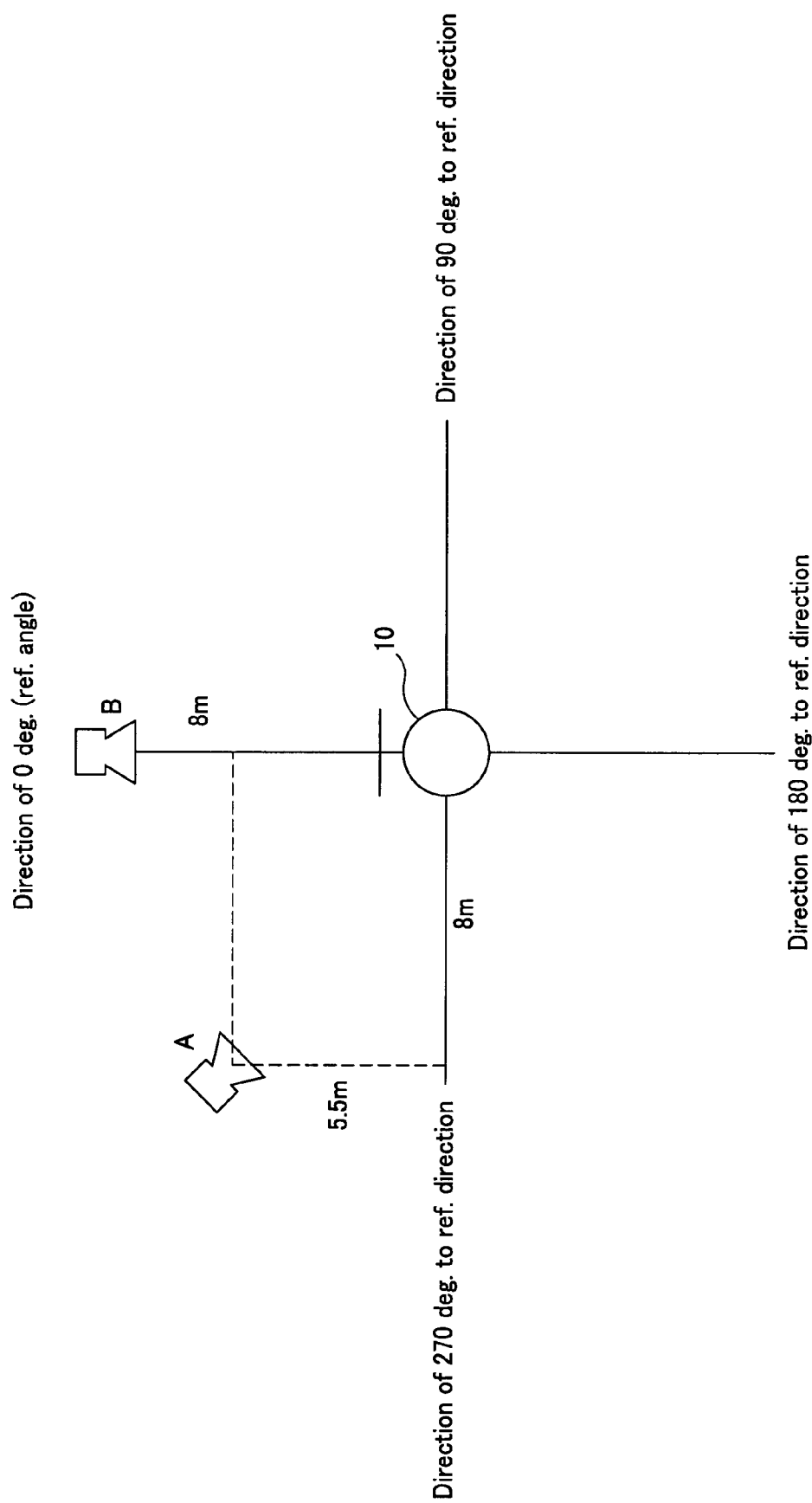
FIG. 11 shows the geometric relation between a microphone and a sound source disposed in an arbitrary place away from the microphone.

The above was measured by the sound source localizer 1 with a sound source placed in a position (A point) of 5.5 m from a microphone 10 in a first direction (0-deg. direction (=reference direction)) and of 8 m from the 5.5-m position in a fourth direction (270-deg. direction) and which is made to generate a TSP (Time Stretched Pulse) signal (of 500 Hz in frequency) as shown in FIG. 11. It is calculated that the sound source is an angle of about 304.5 deg. to the receiver 2. Accordingly, in the sound source localizer 1 as the embodiment of the present invention can localize the sound source with little error.

Also, in step ST6, the calculator 11 calculates the sound level of the sound source on the basis of the sound-source arrival angle and direction determined in steps ST4 and ST5, respectively. The highest one of the sound levels measured by the microphones is taken as the sound level of the sound source. In this embodiment, this microphone is the microphone 10D (0 dB) directed at the angle of 270 deg. to the microphone 10A to show the predetermined directivity D. Since the sound-source arrival direction has been determined in step ST5, the microphone 10D will determine an arrival angle of the sound source to be 305 deg.−270 deg.=35 deg. Accordingly, the sound level of the sound source can be determined by correcting the absolute value of a sensitivity difference caused by a difference direction of the microphone 10D and sound-source arrival direction based on the sound level measured by the microphone 10D.

It should be noted that step ST4 (determination of the sound-source arrival angle) and step ST5 (determination of the sound-source arrival angle) may be effected in an inverse order.

Here will be explained an example in which a TSP signal is generated from the sound source (at the point B) disposed in a position of 8 m from the receiver 2 in the 0-deg. direction (reference direction) as shown in FIG. 11.

Figure 12:
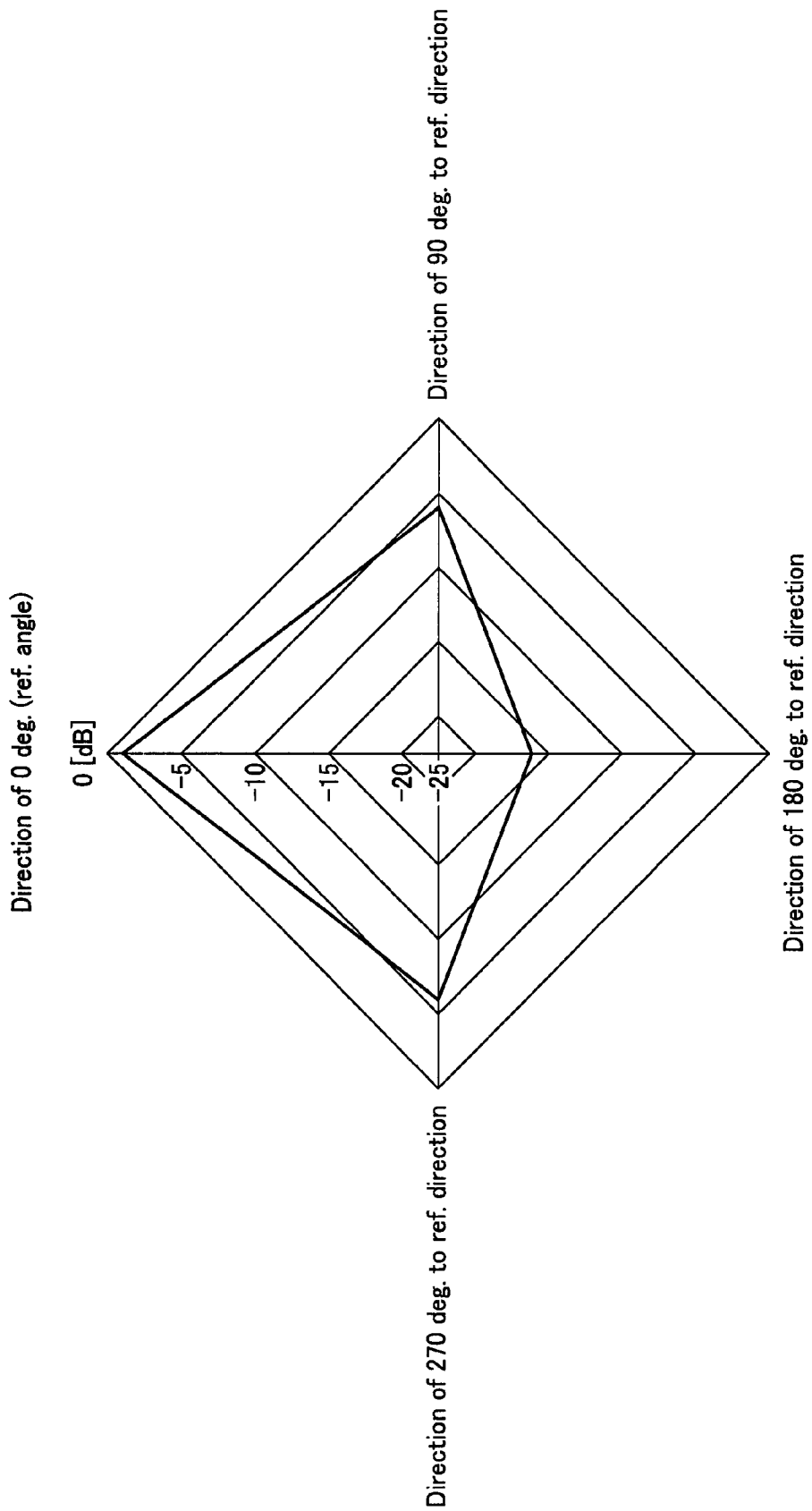
FIG. 12 shows levels of a signal detected in different directions.

FIG. 12 shows the result of level calculation by the calculator 11 of a signal from each of the aforementioned directions on the basis of a signal supplied from the receiver 2. The level of the signal received from the 0-deg. direction is about 0 dB, level of the signal received from the 90-deg. direction is about −6 dB, level of the signal received from the 180-deg. direction is about −16 dB and level of the signal received from the 270-deg. direction is about −6 dB.

As shown in FIG. 12, the difference in level between the signal received from the 0- and 180-deg. directions, respectively, is 16 dB (=0−(−16)), and that between the signal received from the 90- and 270-deg. directions, respectively, is 0 dB (=−6−(−6)).

Accordingly, the sound-source arrival direction is determined based on the large difference in level between the received signals, that is, based on the difference in level between the signals received from the 0- and 180-deg. directions, respectively, and the sound-source arrival angle is determined based on the smaller difference in level between the received signals, namely, on the difference in level between the signals received from the 90- and 270-deg. directions, respectively.

Therefore, the arrival direction of the sound source is determined, by reading the curves in FIG. 8A based on the difference in level (16 dB) between the signals received from the 0- and 180-deg. directions, respectively, to be within ranges between 0 and 90 deg. and between 270 and 360 deg. (that is, frontward), and the arrival angle of the sound source is determined, by reading the curves in FIG. 8B based on the difference in level (0 dB) between the signals received from the 90- and 270-deg. directions, respectively, to be 0 deg.

As above, the sound source localizer 1 as the embodiment of the present invention includes the receiver 2 including the highly versatile microphones 10 each having the directivity D, the data base 12 having pre-stored therein the data bases (first and second sensitivity difference data bases) including the directional-sensitivity differences between the microphones of the receiver 2, pointed in one direction and in a direction of 180 deg. in relation to the one direction, respectively, the calculator 11 that calculates the difference in level between the signals received by the receiver 2 from the different directions and determines the sound-source direction, angle and level with reference to the calculated differences in level between the signals received from the different directions, first and second sensitivity difference data bases based on the directivity D of the microphones 10 stored in the data base 12. Thus, since the directional-sensitivity differences between the microphones of the receiver 2, pointed in one direction and in a direction at an angle of 180 deg. to the one direction, respectively, are used, the sensitivity difference data base function is linear and angle resolution is uniform, so that the sound-source arrival direction, angle and level can be determined with little error.

Accordingly, the sound source localizer 1 as the embodiment of the present invention measures a sound source with the use of the highly versatile, directional microphones, not any microphones having a special directivity. Therefore, it can make a highly objective determination on the basis of the result of measurement.

Another embodiment

The sound source localizer 1 may be applied as another embodiment of the present invention to estimate the direction of an arbitrary sound source such as noise, music or the like on the real-time basis. For example, it is utilizable to localize a noise source such as an unknown sound source, place where the sound insulation is poor or the like, or make real-time evaluation of the spatial impression of a music being played actually in a hall or the like. This embodiment will be explained in detail below.

Figure 13:
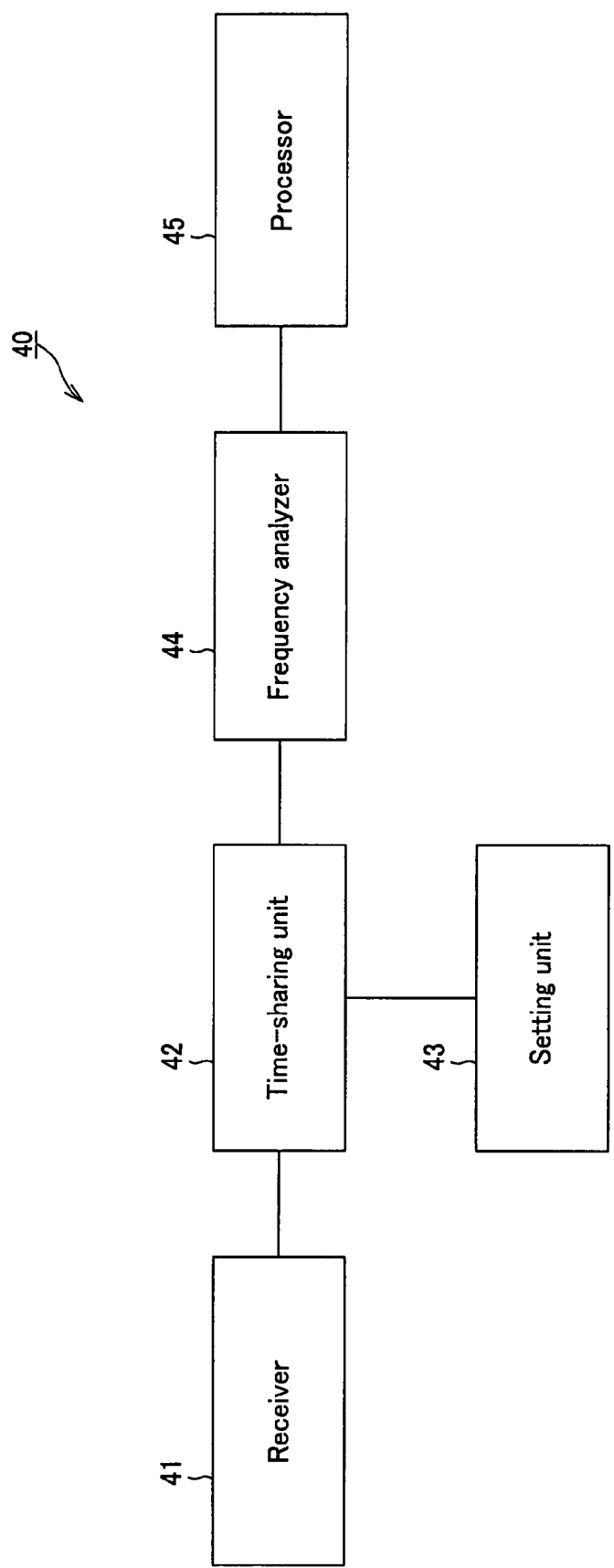
FIG. 13 is a schematic block diagram of a sound source localizer as another embodiment of the present invention.
Figure 14:
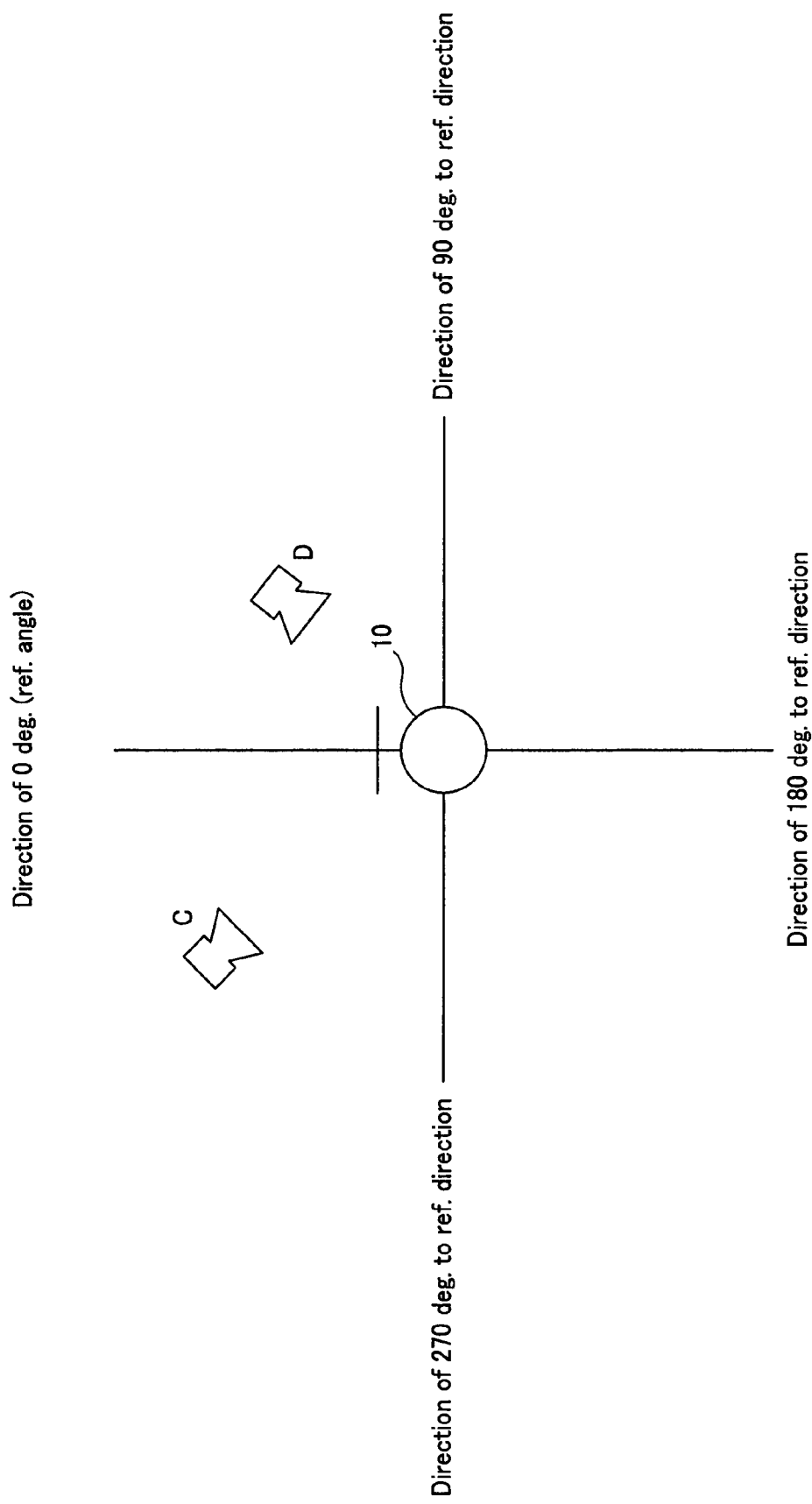
FIG. 14 shows the geometric relation between a microphone and a sound source disposed in an arbitrary place remote from the microphone.

As shown in FIG. 13, the sound source localizer as the second embodiment, generally indicated with a reference numeral 40, includes a receiver 41 composed of a plurality of microphones to receive signals, a time divider 42 to make time division of a signal received by the receiver 41 with an arbitrary time window width, a setting unit 43 to set a time window width, a frequency analyzer 44 to make Fourier transform of the signal subjected to the time division in the time divider 42, and a processor 45 to make special signal processing of the signal whose frequency has been analyzed by the frequency analyzer 44.

The receiver 41 is constructed similarly to the receiver 2 shown in FIG. 2. It should be noted that the sound source localizer 40 will be explained herebelow on the assumption it uses four microphones 10A to 10D equal in directivity to each other.

The time divider 42 divides the signal received by the receiver 41 in the time direction on the basis of the time window width set by the setting unit 43.

The setting unit 43 sets a time window having an arbitrary width. It should be noted that the setting unit 43 sets a time window having a width that is larger than at least the time wavelength (1 period) of a signal received by the receiver 41.

The frequency analyzer 44 makes Fourier transform of the signal output from the time divider 42 to analyze the signal frequency at every time window width.

The processor 45 is constructed similarly to the aforementioned processor 3. It includes a calculator 11 which calculates the level of the signal received by the receiver 41 on the basis of a signal supplied from the frequency analyzer 44 and a data base 12 which has stored therein various kinds of information such as the directivity D of the microphones.

The calculator 11 calculates the difference in sensitivity (see FIG. 8A) between the sound received by the microphone pointed in the 0-deg. direction (reference direction) to show the predetermined directivity D and that received by the microphone pointed in the 180-deg. direction to show the predetermined directivity D as shown in FIG. 7A, and also the difference in sensitivity (see FIG. 8B) between the sound received by the microphone pointed in the 90-deg. direction to show the predetermined directivity D and that received by the microphone pointed in the 270-deg. direction to show the predetermined directivity D as shown in FIG. 7B.

As having previously been described, the calculator 11 determines the sound arrival direction (lateral direction) on the basis of a portion of the sensitivity-difference curve in which the difference in sensitivity is as large as about ±20 dB (curve gradient is gentle) and the sound arrival angle on the basis of a portion of the curve in which the sensitivity difference is small but the angle resolution is large (curve gradient is steep).

Also, the arrival direction and angle are approximated by the following linear expressions:

Determination of arrival direction (lateral):

$$\text{Between 45 and 135 deg.: } \theta = -3.0883(L_0 - L_{180}) + 90 \qquad (1)$$

$$\text{Between 225 and 315 deg.: } \theta = 3.0883(L_0 - L_{180}) + 270 \qquad (2)$$

Determination of arrival angle:

$$\text{Between 215 and 45 deg.: } \theta = -3.0883(L_{270} - L_{90}) + 360 \qquad (3)$$

$$\text{Between 135 and 225 deg.: } \theta = 3.0883(L_{270} - L_{90}) + 180 \qquad (4)$$

where $\theta$ is an angle, $L_0$, $L_{90}$, $L_{180}$ and $L_{270}$ are levels of sounds received by the microphones pointed in the 0-, 90-, 180- and 270-deg. directions, respectively.

In case $\theta$ in the expression (3) exceeds 360, 360 is subtracted from the result of calculation. The results of calculation by the above-given expressions (1) to (4) are to be stored into the data base 12. In this case, however, the aforementioned first and second sensitivity difference data bases are not to be stored into the data base 12.

Here will be explained calculation by the sound source localizer 40 of arrival directions of a predetermined signal emitted from two different sound sources.

More specifically, a sound source is disposed at a point C in one direction at an angle of 324 deg. to a microphone 10 and another sound source is disposed in a position D in another direction at an angle of 37 deg. to from the microphone 10.

In case white noise and voice of a male announcer are emitted from the point C:

First, the sound source localizer 40 was used to make real-time calculation of arrival directions of a stationary sound continuously emitted for 5 seconds from the sound source at the point C and a varying sound continuously emitted similarly for 5 seconds from the sound source at the point C. The result of calculation will be explained below. It should be noted that the stationary sound is white noise and varying sound is announcer's voice. In the determination of the sound arrival directions, pink noises not correlated with each other were additionally given to microphones disposed in four different directions on the assumption that there will possibly be S/N ratios of 10 and 30 dB in order to avoid the influence of background noise.

Figure 15:
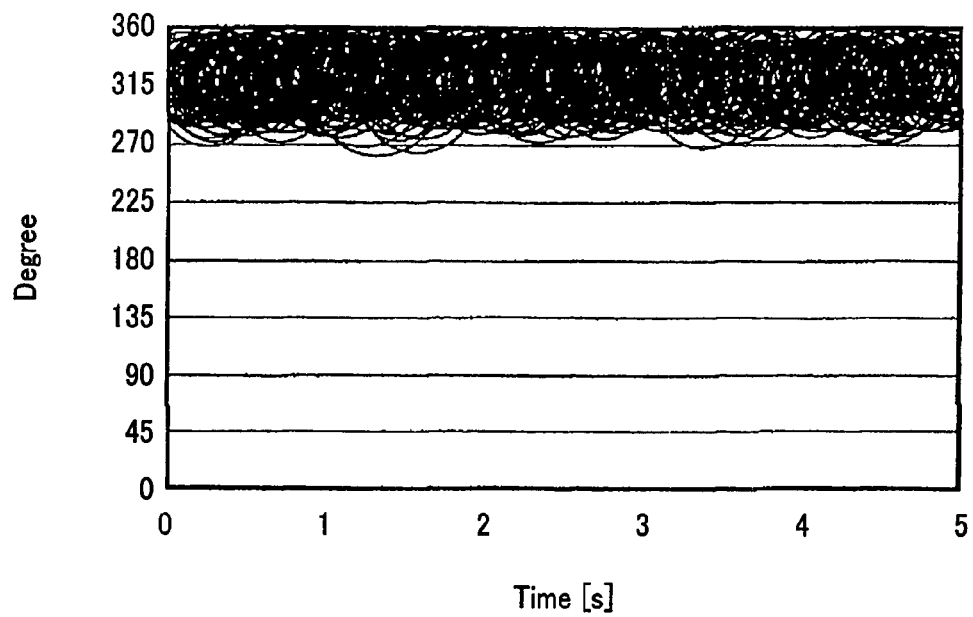
FIG. 15 shows the result of a white noise processing by the sound source localizer shown in FIG. 13.
Figure 16:
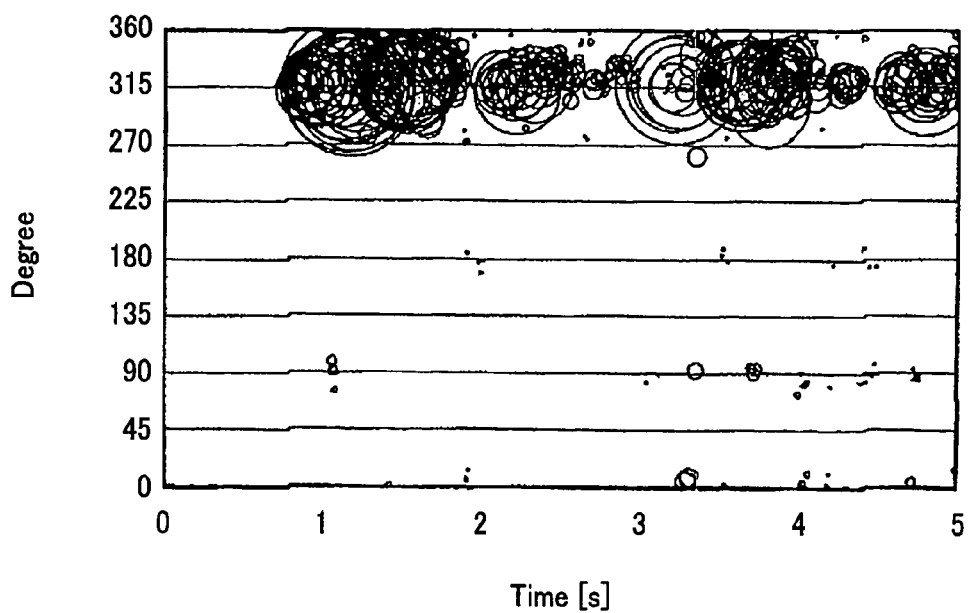
FIG. 16 shows the result of processing of a male announcer's voice by the sound source localizer shown in FIG. 13.

The calculated white-noise arrival direction is shown in FIG. 15 and calculated male-announcer's voice arrival direction is shown in FIG. 16. FIG. 17 shows the result of comparison in difference between the calculated arrival angle and time window width when the window function (rectangular window) is changed by the setting unit 43. It should be noted that the arrival angles were calculated at every one-octave band using the aforementioned expressions (1) to (4). FIG. 17A represents the white noise by a mean angle weighted with an energy at every time window and FIG. 17B represents the male-announcer's voice by a mean angle weighted with the energy at every time window.

The above results show that the sound-source arrival direction could have been estimated with such an accuracy as the actual sound-source arrival direction (324 deg.) though the measured levels of both the varying sound to stationary sound vary from one measurement to another. The time window width had little influence on the sound-source arrival directions in "4096" and "32768" columns. Although the microphones used have a size as small as several cm, they can cover a wide range of sound from low to high frequency with an almost equal accuracy.

In case voice of a male announcer is emitted from the point C while voice of a female announcer is emitted from the point D:

Next, the sound source localizer 40 was used to make real-time calculation of arrival directions of male-announcer's voice emitted from a sound source at the point C and female-announcer's voice emitted from a sound source at the point D at the same time as the male-announcer's voice. It should be noted that in the determination of the sound arrival directions, pink noises not correlated with each other were additionally given to microphones disposed in four different directions on the assumption that there will possibly be S/N ratios of 10 and 30 dB in order to avoid the influence of background noise.

Figure 18A:
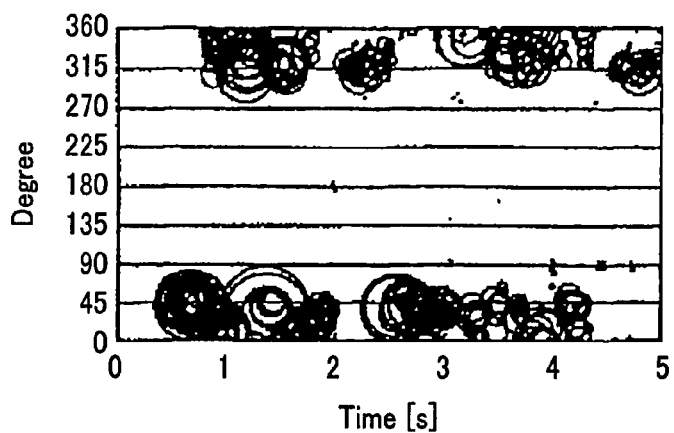
FIGS. 18A and 18B show a presentation, by circles, of an arrival direction and magnitude of energy in each time window.
Figure 18B:
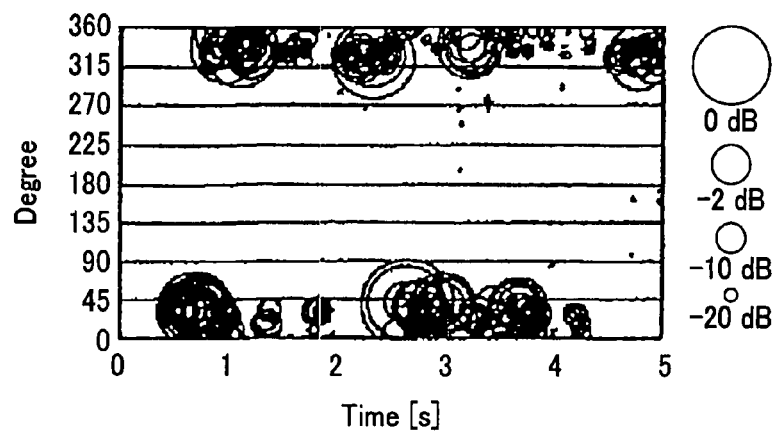

FIG. 18 represents the arrival direction and magnitude of the energy in each time window by circles. As shown, large energies are in succession nearly at angles of 324 deg. and 37 deg. to the direction of the sound source in both the measurements of the sounds of 500 Hz (in FIG. 18A) and 2 kHz (in FIG. 18B) in frequency. Namely, it is possible to separate and extract directions of two sound sources.

Figure 19A:
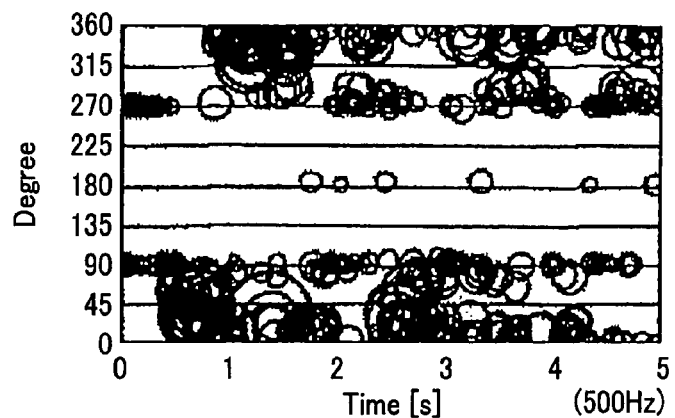
FIGS. 19A and 19B show the result of direction estimation in the presence of a background noise of 10 dB in S/N ratio.
Figure 19B:
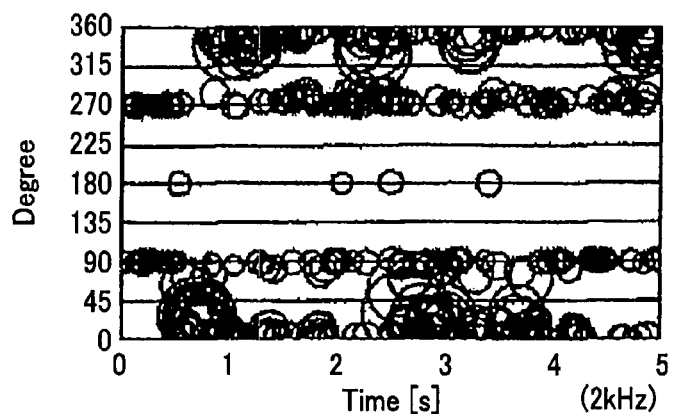
Figure 20A:
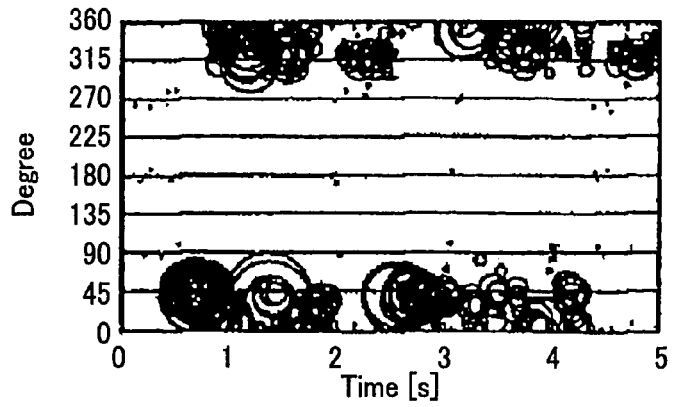
FIGS. 20A and 20B show the result of direction estimation in the present of a background noise of 30 dB in S/N ratio.

Results of estimation of the direction of a sound source in the presence of background noises of 10 dB and 30 dB in S/N ratio are shown in FIGS. 19 and 20, respectively.

The results of the estimation made in the presence of the background noise of 10 dB in S/N ratio show that no arrival angle could not be estimated in both the measurements of the sounds of 500 Hz (in FIG. 19A) and 2 kHz (in FIG. 19B) but it could have been estimated that a sound has come from a direction ranging from 315 to 45 deg.

Figure 20B:
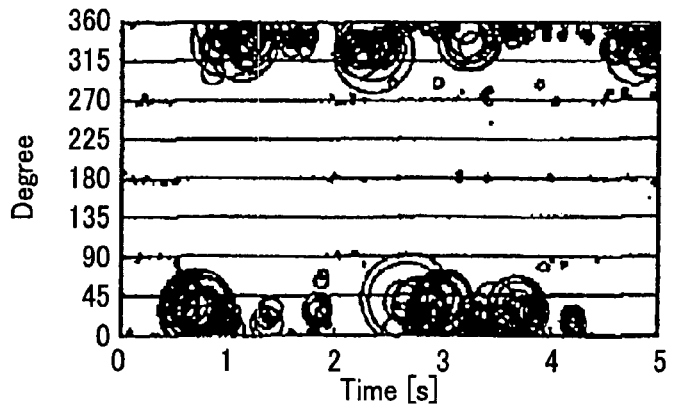

On the other hand, the results of the estimation made in the presence of the background noise of 30 dB in S/N ratio show that the measurement has little been influenced by the noise but an arrival angle could have been estimated with separation of the sound source in both the measurements of the sounds of 500 Hz (in FIG. 20A) and 2 kHz (in FIG. 20B). That is, it was known that the accuracy of estimation was low when the S/N ratio is below 10 dB.

As will be known from FIG. 19, however, there is a tendency that an influence of the noise on the measurement was detected in the axial directions of the microphone such as the angles of 0, 90, 180 and 270 deg. Conversely, it can be estimated that the sound source can statistically be separated.

Since the sound source localizer 40 as the second embodiment of the present invention includes the receiver 41 composed of a plurality of microphones to receive signals, time divider 42 to make time division of a signal received by the receiver 41 with an arbitrary time window width, setting unit 43 to set a time window width, frequency analyzer 44 to make Fourier transform of the signal subjected to the time division in the time divider 42, and processor 45 to make special signal processing of the signal whose frequency has been analyzed by the frequency analyzer 44, it can estimate a direction of an arbitrary sound source such as a noise, music sound or the like on the real-time basis.

Example Application

A combination of the sound source localizer 40 as the embodiment of the present invention and an imaging device to capture a video permits various applications of the present invention.

For example, the imaging device and sound source localizer 40 may be formed integrally with each other. It should be noted that the integral apparatus should include a superimposing unit to superimpose a sound source direction determined by the sound source localizer 40 on an image captured by the imaging device and a display unit to display the result of the superimposition made by the superimposing unit.

For example, in case a sound leaks from a room which has to be soundproof, the level of the leak sound can visually be indicated by directing the apparatus toward the door of the soundproof room to image the room door and superimposing an arrival direction of the leak sound on the captured image.

Also, the sound source localizer 40 may be combined with a surveillance camera and a result of sound-source direction determination by the sound source localizer 40 be informed to the surveillance camera, for example. It should be noted that in this example, there should be provided a direction controller to adjust the imaging direction of the surveillance camera on the basis of the result of the sound-source direction determination by the sound source localizer 40.

Also, the combination of the sound source localizer 40 and surveillance camera may be disposed in a predetermined position inside a room so that when an authorized person having entered the room and made a sound, the arrival direction of the sound can be determined by the sound source localizer 40 and the imaging direction of the surveillance camera be adjusted based on the result of determination to capture the person.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

INDUSTRIAL APPLICABILITY

As having been described in the foregoing, the sound source localizing apparatus and method according to the present invention use highly versatile, directional microphones, not any one having a special directivity, to measure a sound source. Thus, it is possible to make a highly objective determination on the basis of the result of measurement.

Also, the sound source localizing apparatus and method use the difference in directional sensitivity between the microphones pointed in one direction and in a direction at the angle of 180 deg. to the one direction to determine the arrival direction and angle of a sound source, so that the sensitivity difference function is linear and the angular resolution is uniform. Thus, it is possible to determine the arrival direction and angle of the sound source accurately with little error.

The invention claimed is:

1. A sound source localizing apparatus, comprising:
a receiving unit including first to fourth receivers each having a predetermined directivity and all disposed at a measuring point set in an arbitrary place to receive a signal coming from a sound source, the first receiver being pointed in a reference direction to show a highest directional sensitivity, second receiver being directed at an angle of 90 deg. to the reference direction to show a highest directional sensitivity, third receiver being directed at an angle of 180 deg. to the reference direction for a highest directional sensitivity, and the fourth receiver being directed at an angle of 270 deg. to the reference direction to show a highest directional sensitivity;
a storage unit having stored therein a first sensitivity-difference data base including angle-by-angle differences in sensitivity between the first receiver directed in the reference direction to show the predetermined directivity and third receiver directed at the angle of 180 deg. to the reference direction to show the predetermined directivity and a second sensitivity-difference data base including angle-by-angle differences in sensitivity between the second receiver directed at the angle of 90 deg. to the reference direction to show the predetermined directivity and fourth receiver directed at the angle of 270 deg. to the reference direction to show the predetermined directivity;
a time dividing unit to perform time division of the signals received by the first, second, third and fourth receivers, respectively, with an arbitrary time window width,
a frequency analyzing unit to apply a Fourier transform to each of the signals subjected to the time division in the time dividing unit,
a first calculating unit for calculating a difference in level in each arbitrary frequency band between a signal received by the first receiver and subjected to the Fourier transform in a frequency analyzing unit and the signal received by the third receiver and subjected to the Fourier transform in the frequency analyzing unit;
a second calculating unit for calculating a difference in level in each arbitrary frequency band between a signal received by the second receiver and subjected to the Fourier transform in the frequency analyzing unit and the signal received by the fourth receiver and subjected to the Fourier transform in the frequency analyzing unit;
an arrival-angle determining unit for making a comparison between a result of the calculation made in the first calculating unit and result of the calculation made in the second calculating unit to determine an arrival angle of the sound source on the basis of the result of comparison and with reference to a range used for determination of a sound-source arrival angle depending upon the first and second sensitivity-difference data bases stored in the storage unit; and
an arrival-direction deciding unit for deciding an arrival direction of the sound source on the basis of the result of the determination made in the arrival-angle determining unit and with reference to a range used for determination of a sound-source arrival direction depending upon the first and second sensitivity-difference data bases stored in the storage unit, to thereby calculate a sound-source direction and sound level in each frequency band.

2. The apparatus of claim 1, wherein the time dividing unit makes time division, with an arbitrary time window width, of the signals received by the first, second, third and fourth receivers, respectively, and also of the signal received by the fifth receiver pointed perpendicularly to the first to fourth receivers to show the predetermined directivity and signal received by the sixth receiver pointed an the angle of 180 deg. to the direction of the fifth receiver to show the predetermined directivity.

3. A sound source localizing method, comprising:
a receiving step of receiving a signal coming from a sound source at a measuring point set in an arbitrary place by a first receiver having a predetermined directivity, disposed at a measuring point and pointed in a reference direction to show a highest directional sensitivity, a second receiver having a predetermined directivity, disposed at the measuring point and directed at an angle of 90 deg. to the reference direction to show a highest directional sensitivity, a third receiver having a predetermined directivity, disposed at the measuring point and directed at an angle of 180 deg. to the reference direction to show a highest directional sensitivity and a fourth receiver having a predetermined directivity, disposed at the measuring point and directed at an angle of 270 deg. to the reference direction to show a highest directional sensitivity;
a time dividing step for performing division of the signals received by the first, second third and fourth-receivers, respectively, with an arbitrary time window width, in the receiving step;
a frequency analyzing step for applying a Fourier transform to each of the signals subjected to the time division in the time dividing step;
a first calculating step of calculating a difference in level in each arbitrary frequency band between a signal received by the first receiver and subjected to the Fourier transform in a frequency analyzing step and signal received by the third receiver and subjected to the Fourier transform in the frequency analyzing step;
a second calculating step of calculating a difference in level in each arbitrary frequency band between a signal received by the second receiver and subjected to the Fourier transform in the frequency analyzing step and signal received by the fourth receiver and subjected to the Fourier transform in the frequency analyzing step;
an arrival-angle determining step of making a comparison between a result of the calculation made in the first calculating step and result of the calculation made in the second calculating step to determine an arrival angle of the sound source on the basis of the result of comparison and with reference to a range used for determination of a sound source arrival angle depending upon a first sensitivity-difference data base including differences in sensitivity between the first receiver pointed in the reference direction to show the predetermined directivity and third receiver directed at the angle of 180 deg. to the reference direction to show the predetermined directivity and a second sensitivity-difference data base including differences in sensitivity between the second receiver directed at the angle of 90 deg. to the reference direction to show the predetermined directivity and fourth receiver directed at the angle of 270 deg. to the reference direction to show the predetermined directivity; and an arrival-direction deciding step of deciding an arrival direction of the sound source on the basis of the result of the determination made in the arrival-angle determining step and with reference to a range used for determination of a sound-source arrival direction depending upon the first and second sensitivity-difference data bases stored in a storage unit, to thereby calculate a sound-source direction and sound level in each frequency band.

* * * * *